US008412389B2

(12) United States Patent
Tessier

(10) Patent No.: US 8,412,389 B2
(45) Date of Patent: Apr. 2, 2013

(54) INTEGRITY MONITORING OF INERTIAL REFERENCE UNIT

(75) Inventor: Claude Tessier, Sainte-Adele (CA)

(73) Assignee: Bombardier Inc., Dorval, Quebec (CA)

( * ) Notice: Subject to any disclaimer, the term of this patent is extended or adjusted under 35 U.S.C. 154(b) by 340 days.

(21) Appl. No.: 12/935,653

(22) PCT Filed: Apr. 21, 2009

(86) PCT No.: PCT/IB2009/005327
§ 371 (c)(1),
(2), (4) Date: Oct. 29, 2010

(87) PCT Pub. No.: WO2009/130576
PCT Pub. Date: Oct. 29, 2009

(65) Prior Publication Data
US 2011/0040430 A1 Feb. 17, 2011

Related U.S. Application Data

(60) Provisional application No. 61/046,601, filed on Apr. 21, 2008.

(51) Int. Cl.
*G05D 3/00* (2006.01)
*G06F 17/00* (2006.01)
(52) U.S. Cl. .............................................. 701/3; 701/1
(58) Field of Classification Search ........................ None
See application file for complete search history.

(56) References Cited

U.S. PATENT DOCUMENTS 5,841,537 A 11/1998 Doty
5,923,286 A 7/1999 Divakaruni

FOREIGN PATENT DOCUMENTS

EP 1 679 567 7/2006

OTHER PUBLICATIONS

Patton, R.J., "Fault Detection and Diagnosis in Aerospace Systems Using Analytical Redundancy," Condition Monitoring and Fault Tolerance, IEE Colloquium (Jan. 1, 1990).
Chien, T.T., "An Adaptive Technique for a Redundant-Sensor Navigation System," Sc.D. Thesis, M.I.T., (Feb. 1972).
International Search Report for PCT/IB2009/005327, dated Jul. 21, 2009.

*Primary Examiner* — Khoi Tran
*Assistant Examiner* — Bhavesh V Amin
(74) *Attorney, Agent, or Firm* — Thomas & Karceski, PC

(57) ABSTRACT

Systems, methods, and machine-executable programming products adapted for the control of aircraft or other vehicles by receiving from at least one Inertial Reference System (IRS), including a plurality of Inertial Reference Units (IRUs), signals representing vehicle state data; receiving from at least one Augmented Direct Mode Sensor (ADMS) signals representing independently-acquired vehicle state data corresponding to at least a subset of the signals received from the IRS; performing signal selection and fault detection processes on the signals received from the at least one IRS and on the corresponding signals received from the ADMS; based at least partly on the signal and fault detection processes, determining whether at least one component of at least one of the IRS and ADMS is in a fault condition; and based on the fault condition, providing to at least one vehicle control system device one or more vehicle control command signals.

14 Claims, 9 Drawing Sheets

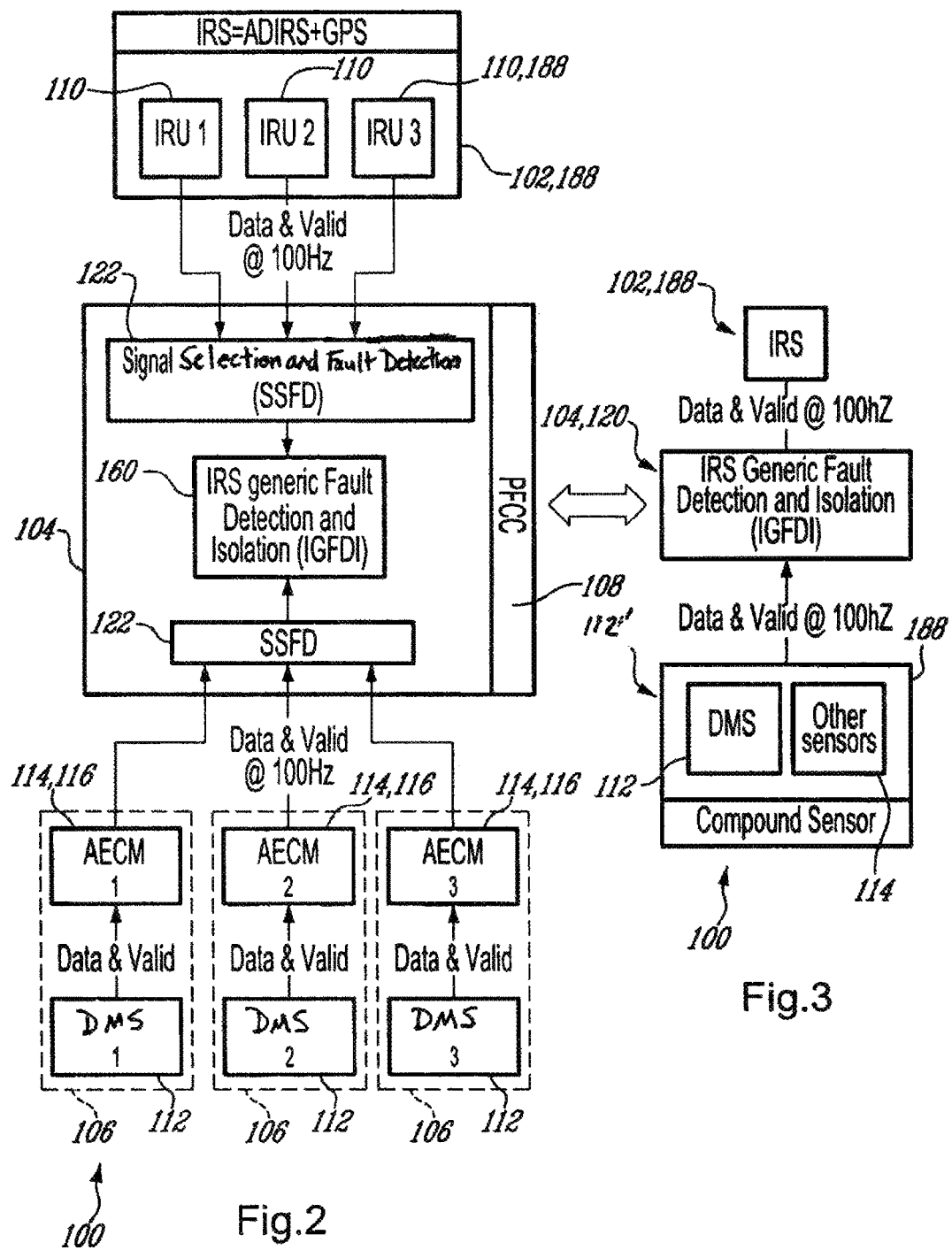

INTEGRITY MONITORING OF INERTIAL REFERENCE UNIT

CROSS REFERENCE TO RELATED APPLICATIONS

This is a National Stage Patent Application that relies for priority on International Patent Application No. PCT/IB2009/005327, with an International Filing Date of 21 Apr. 2009. This application also claims the priority of U.S. provisional patent application Ser. No. 61/046,601, filed 21 Apr. 2008 and entitled Inertial Reference Unit (IRU) Integrity Monitoring Based on Simple Sensors and Analytic Redundancy. Both patent applications are incorporated herein by reference.

TECHNICAL FIELD

The application relates to the control of aircraft and other vehicles, including particularly improved systems, methods, and machine programming products for detecting faults in and monitoring redundant components of aircraft flight and other vehicle control systems.

BACKGROUND OF THE ART

In recent years fly-by-wire (FBW) and other flight and vehicle control systems (FCSs) have been developed for the improvement of safety and performance in the operation of manned and unmanned aircraft and other vehicles, such as spacecraft.

The goals of safety and performance in vehicle control have traditionally been considered to be conflicting: for example, the safety of an aircraft intended for commercial passenger transport can be improved by increasing its stability, at the cost of rapid performance in response to control inputs; while the performance of military and sport aircraft can be improved by making them partially or even wholly unstable. Properly-configured automatic control systems such as FCSs can be used to reconcile the conflicting needs of stability and performance without loss of safety.

It must be borne in mind, however, that decreased stability for improved performance tends to increase control workload associated with safe flight of commercial and other vehicles or aircraft, and can in some circumstances make safe flight impossible without the assistance of properly-configured automatic FCSs. Both safety and performance are critically reliant upon the availability and integrity of the FCS.

Operational economics also tend to impose high expectations on FCSs, as well as on a large number of other aircraft systems—requiring, in some cases, that an aircraft be able to operate safely with one or more failed system elements for a limited amount of time, until for example the aircraft is able to return to its maintenance base.

SUMMARY

In various aspects the invention addresses the problem of detecting generic failures that could potentially appear in Inertial Reference Units (IRUs) and other control system components. IRUs and other sensors provide data representing one or more vehicle state parameters to one or more primary flight control computers (PFCCs). Such data is used as feedback signals in implementing flight or other control laws (CLAWs) to artificially provide or enhance vehicle stability while providing acceptable handling and performance qualities for pilots operating a vehicle in manual control mode, to fly an aircraft in automatic flight mode, and/or to keep an aircraft within its intended operational and structural load envelopes at all times.

In various aspects the invention provides systems, methods, and machine-executable programming products adapted for the control of aircraft or other vehicles by receiving from at least one Inertial Reference System (IRS) comprising a plurality of Inertial Reference Units (IRUs), which may be similar or dissimilar, signals representing vehicle state data; receiving from at least one Augmented Direct Mode Sensor (ADMS) signals representing independently-acquired vehicle state data corresponding to least a subset of the signals received from the IRS; performing signal selection and fault detection processes on the signals received from the at least one IRS and on the corresponding signals received from the ADMS; based at least partly on the signal and fault detection processes, determining whether at least one component of at least one of the IRS and ADMS is in a fault condition; and based on the determination whether the at least one component is in a fault condition, providing to at least one vehicle control system device one or more vehicle control command signals.

Beyond the field of vehicle control, these and other features of the invention can generally provide a solution to the detection of generic failures in any application, be the units complex or simple.

Further details of these and other aspects of the subject matter of this application will be apparent from the detailed description and drawings included below.

DESCRIPTION OF THE DRAWINGS

Reference is now made to the accompanying drawings, in which:

FIGS. 1-4 are schematic block diagrams of embodiments of systems suitable for use in implementing the invention.

DETAILED DESCRIPTION OF THE PREFERRED EMBODIMENTS

Various aspects of preferred embodiments of the invention are described through reference to the drawings, in which like numbers refer to like elements. Without any loss in generality, the invention is explained in the context of specific examples; however, it is more generally applicable.

Figure 1:
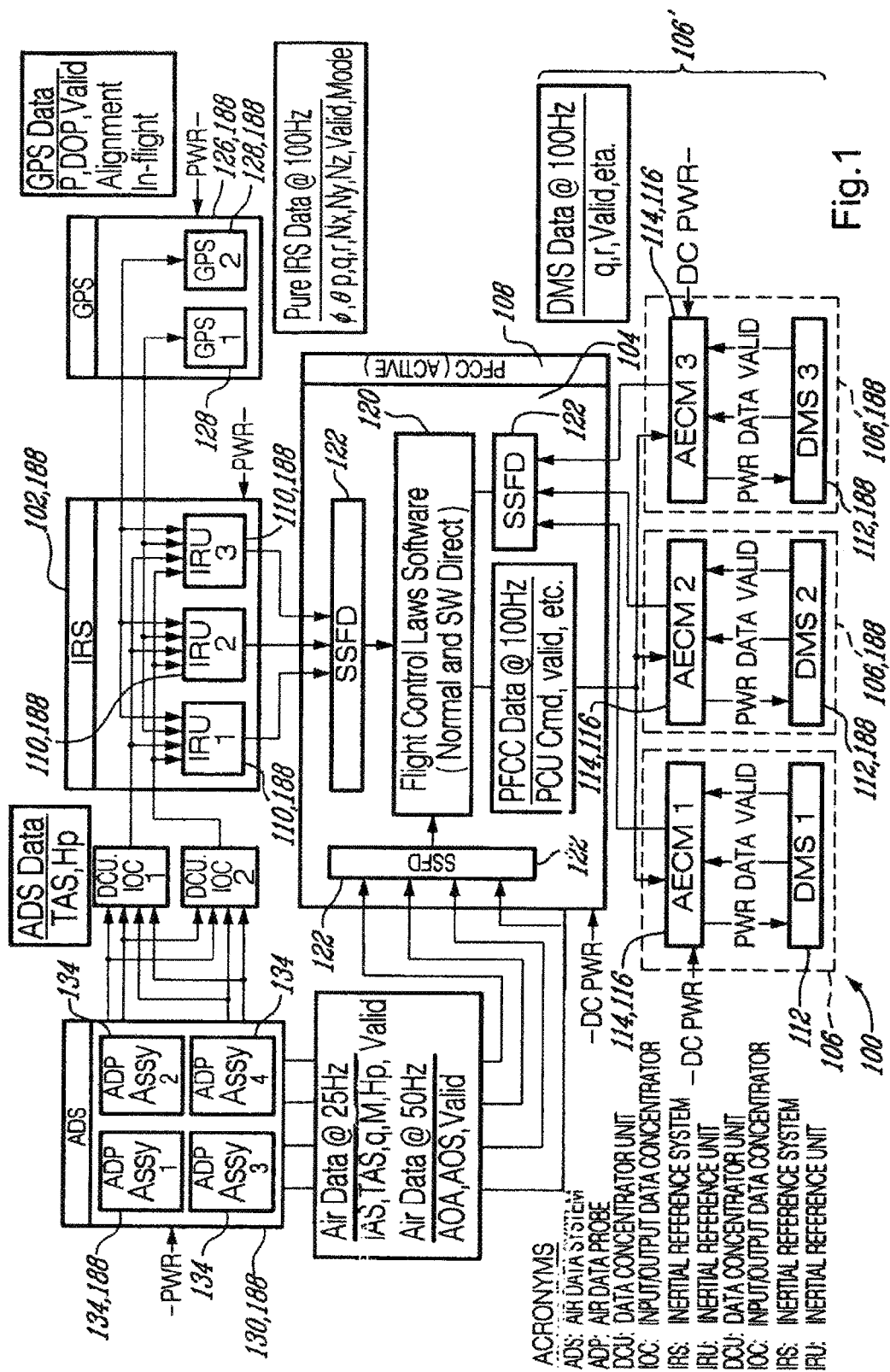

FIG. 1 is a schematic block diagram of an embodiment of a system 100 which can be advantageously employed in implementing various aspects of the invention. In the embodiment shown, system 100 is a flight control system (FCS) comprising inertial reference system (IRS) 102, one or more primary flight control computer(s) (PFCC(s)) 108, fault detection and isolation module(s) (FDI(s)) 104, and a plurality 106' of individual or augmented, or compound, sensors 112. Typically, the latter sensors are simpler than the complex IRUs. The Direct Mode Sensors (DMS) 112 are often supplied to support a degraded but safe mode of operation in case of failure of the extensively augmented Normal Mode of operation.

In the embodiment shown in FIG. 1, IRS 102 comprises a plurality of independent partially or completely similar inertial reference units (IRUs) 110 for providing signals representing redundant vehicle (e.g., aircraft or spacecraft) state data measurements at one or more predetermined or otherwise selected sampling rates to PFCC(s) 108. Examples of state data measurements monitored by IRUs 110 include linear accelerations and angular rates and attitude angles. State data measurement signals provided by IRU(s) 110 to PFCC(s) 108 and/or other devices can be augmented by signals representing the same and/or other state measurements provided by, for example, one or more global positioning system(s) (GPS(s)) 126 and/or air data system(s) (ADS(s)) 130. In the embodiment shown in FIG. 1, GPS 126 and ADS 130 each comprise multiple independent units 128 and 134, respectively. Independent GPS units 128 and ADS units 134 can provide redundant and/or independent and distinct output signals for various forms of signal and aircraft state verification to be performed by, for example, one or more signal selection and fault detection systems (SSFD(s)) 122 of FDI 104.

Typical sampling rates for IRU(s) 110 are in the range of about. 50-100 Hz, which typically also covers the execution rates for CLAWS operations by PFCC(s) 108. For ADS(s) 130, and other state measurement signal devices rates are often in the range of 25-50 Hz (as shown in the figures). For GPS, ranges are typically lower, say 1-10 Hz. The rates may be selected based on CLAWS stability and performance considerations for the aircraft, and to minimize the impact of data delays (control may be very sensitive to such delays).

The sets of IRUs 110 and other state data sensors or data acquisition devices 188, such as GPSs 128, ADPs 134, and DMSs 112, comprised by systems 100 may be identical among themselves or have any desired degree of hardware and/or software dissimilarities.

As will be understood by those skilled in the relevant arts, the invention may in many circumstances be advantageously implemented by employing IRUs 110 having no or insignificant built-in (i.e. internal) dissimilarity (discussed further below). Operation of IRS 102 may, as mentioned, be supplemented through the use of GPS receivers 128, which may be provided redundantly and which can themselves be similar or dissimilar, and/or or also by one or more ADSs 134, which may provide air state data to the IRS 102 (e.g., airspeed and altitude). In currently typical implementations, ADS(s) 130 would normally be redundant and dissimilar, in contrast to the various IRU(s) 110.

Redundant or unique PFCC(s) 108 receive from IRS(s) 102/IRU(s) 110 and other sources 188, such as ADS(s) 130 and DMS(s) 112, signals representing aircraft state parameters. Such signals may be processed by PFCC(s) 108 as feedback or other input signals in implementing flight or other control laws (CLAWs) to operate an aircraft, spacecraft, or other vehicle, as for example by artificially providing or enhancing the stability of an aircraft while providing acceptable handling and performance qualities for pilots operating the aircraft in manual flight control mode, flying an aircraft in automatic flight mode, and/or to keeping the aircraft within its intended operational and structural load envelopes at all times. As shown in FIG. 1, PFCC(s) 108 may process state signal inputs provided by IRU(s) 110 and/or other devices, including sensors or data acquisition devices 188 such as GPS(s) 128, ADP(s) 134, and DMSs 112, according to CLAWs through the use of flight control laws apparatus such as software, firmware, or hard-wired applications implemented by general or special purpose processors 120.

The use of suitably-configured computer controls using systems 100 comprising components such as PFCCs 108 can permit performance optimization for the controlled vehicle, within acceptable safety margins, by for example implementing so-called envelope protection functions, whereby an aircraft or other vehicle's flight performance is automatically monitored, and prevented from entering risky flight conditions, regardless of pilot input.

Through the use of such envelope protection functions pilots can be provided with the ability to extract optimum performance from of their aircraft without loss of safety.

Both safety and performance are reliant upon the availability and integrity of the FCS 100. Operational economics can also impose high expectations on FCS(s), as well as on a large number of other aircraft systems, requiring in some cases that an aircraft be able to operate safely with one or more failed system elements for a limited amount of time, until for example the aircraft is able to return to its maintenance base.

In FCS(s) 100, such safety and operational requirements have typically been satisfied through hardware redundancy. Hardware redundancy has generally been synonymous with duplication, whereby several functionally equivalent elements, such as computers and/or sensors, are integrated within a single system. In case of failure of one, or even several, elements, a failure detection and isolation (FDI) function 104 can identify the failed element(s) and somehow (e.g., through system reconfiguration) prevent the system from relying on them while retaining full (or at least adequate) functionality.

A typical scheme for FDI is based on majority voting, whereby output signals from various wholly- or partially-redundant elements are compared with each other, and those found to provide outputs differing too much from the others according to preset tolerance(s) are taken out of the system operation (i.e. disconnected or otherwise disabled).

Normally, for critical control applications such as aircraft flight, triple or quadruple redundancy is considered necessary to satisfy both safety and operational requirements. An FDI scheme based on the comparison of output signals from redundant units 188 will detect most and in some cases even all significant random failures occurring in any one of the elements. However, in many cases, controlling and/or monitoring elements such as sensors 188 are so hardware- and/or software-complex that it is not possible to guarantee to an acceptable level of confidence that the components are free from significant generic errors. A generic error may be thought of as the counterpart of a random error, in that it may appear simultaneously in multiple outputs provided by multiple units. Unlike random errors that are unlikely to appear on alt, units at once, a generic error could very well do so. In such cases detection by comparison of various state data outputs with one another is unlikely—the units could all output the same wrong data, and comparison would simply indicate that all units are operating similarly.

Generic errors may, for example, originate from design flaws, manufacturing defects, and/or uncovered software problems. The criticality of such errors is amplified if their occurrence cannot be detected, because the system will perform its function based on erroneous data instead of switching to a degraded yet safer mode.

As will be understood by those skilled in the relevant arts, a typical FBW FCS implementation of system 100 might comprise three or more PFCCs 108, each of them being dual-dissimilar (having both internal and external dissimilarity) and organized in a Command/Monitor architecture (further discussed below). Some existing architectures use triply-dissimilar processors. Triple dissimilarity is similar to dual dissimilarity, but instead of two different functional elements, it is based on three different functional elements. For example, this could be a PFCC comprised of three dissimilar processors (and software), or same processor used three times but executing three dissimilar software, etc. In any given PFCC, the output of the three processors would be compared with one another. Random and generic failures should normally be detected by comparison (or voting)—one processor output would disagree with the other two processors assuming that a single failure occurs. Dissimilarity in PFCCs 108 and other components of system 100 can for example extend to both hardware and software system characteristics. For clarity, such redundancy and dissimilarity are not shown in FIG. 1.

In some embodiments, various aspects of the invention may be implemented with respect to each of PFCC(s) 108, or with respect to any one or more of them, or with the individual processor(s) comprised by a given PFCC 108. As will be understood by those skilled in the relevant arts, a wide variety of implementations consistent with the invention described herein are possible.

Direct mode control channel(s) 106 can comprise DMS(s) 112 and additional components such as actuation electronic control modules (AECMs) 114. Typically, DMS(s) 112 comprise the minimum number and types of sensors needed to support the direct flight (or other control) mode. Where additional sensors are used, DMS(s) 112 can be augmented by the use of additional sensors, such as sensors 114 of FIG. 3. A DMS 112 is said to be Augmented when sensors are added beyond the minimum set required to support a control function, as shown for example by 112' in FIG. 3.

AECM(s) 114, 116, 188 receive control surface deflection commands from PFCC(s) 108 or internally through sensors connected to the pilot controls and drive mechanical (i.e., hydraulic, electro-mechanical) actuation systems to physically deflect or otherwise move vehicle control surfaces or other control devices such as rudders, ailerons, elevators, landing gear, control rockets, speed brakes, flaps, slats, etc., to desired configurations or positions. An electronic servoloop can make cause the AECM to implement command signals through feedback. Normally, feedback would be provided by one or several sensors attached to the actuator.

DMS(s) 112 measure some components of the aircraft state of motion, for example, pitch and yaw rate. The DMS does this using rate gyros for example. These data are used to modify the AECM command from the pilot controls (not typically the PFCC generated commands, which already have these modifications and others included) to implement motion damping and so improve the handling qualities of the aircraft.

Redundant DMS(s) 112 and/or ADMS(s) 112' can normally be similar to one another, in which case they should be simple enough in design to ensure that they could not suffer from a generic failure without being detected. They could also be dissimilar and therefore some sort of voting could be implemented (including the MSPRT embodiments described herein) to detect random and generic failures.

For example, one current approach to the detection of IRU generic failures is to make use of three IRUs, as per this invention, an Attitude and Heading Reference System (AHRS) of dissimilar technology as the IRUs (an AHRS is a sort of lower accuracy IRU, and in some cases it is equivalent but some functions such as navigation may not be provided), and an Integrated Standby Instrument (ISI) of dissimilar technology as the IRU/ADS and AHRS (it includes inertial sensors as well, and other sensors, and is of lower accuracy).

A FBW FCS such as a system 100 can typically implement alternate operation modes to cope with the possibility of a failure or other condition that might affect the ability of the PFCC(s) 108 from supporting the normal flight control mode, or even completely disable all PFCC(s) 108. One such possible mode is called the direct mode. The direct mode is typically designed to be as simple as possible, in order to enable operation of the aircraft or other vehicle with a minimum number of sensors such as data acquisition sensors 188, independently of the PFCC(s) 108, under the direct command of the pilot(s). Typically, in such direct mode operation, manual commands from pilot control inputs are directly interpreted by one or more corresponding AECM(s) 114, 116, and used to drive corresponding control actuation systems to move the desired vehicle control device(s).

Alternatively, in a "normal" mode, such pilot commands can be processed by PFCC(s) 108 according to CLAWs programmed and stored in machine-interpretable form to provide output command signals based on pilot and PFCC inputs used by corresponding AECMS 114, 116 to cause desired or otherwise suitable control device responses. In such normal modes, and typically contrary to the direct mode, the flight control command signals provided by the pilot(s) are augmented by CLAWs output signals to provide better handling qualities and envelope protection, e.g. improved stability during various maneuvers.

To improve handling qualities in such direct modes (particularly where an aircraft or other vehicle is designed to be marginally stable, so as to optimize its performance) additional systems, including independent sensors, may be provided to support simple control augmentation, such as pitch and yaw damper systems. Such functionality may be provided by direct mode sensors (DMSs) 112. Typically, known DMSs 112 can for example comprise pitch and yaw rate gyros, accelerometers, compasses, magnetometers, and/or clinometers. These could be provided as individual sensors, or integrated in one or several packages, such as an Attitude and Heading Reference System (AHRS). For safety reasons, and as shown for example in FIG. 1, a typical architecture may be triple-redundant and hence comprise three or more fully segregated control channels 106, each having its own suite of DMS(s) 112 and AECM(s) 114. Moreover, as control using the direct mode may be used in case of major system failure, it can in some embodiments be advantageous important to select sensors that are fully analyzable and testable, i.e. that have a very high integrity (the probability of them being used while failed has to be very small), in implementing systems 100. It is typically desirable also that such sensors have a good reliability (which can be helped by using simple designs).

As will be understood by those skilled in the relevant arts, any or all of IRU(s) 110, ADS(s) 134, DMS(s) 112, or other sensors 188, and other components of system 100 can, where redundant, in many circumstances be advantageously provided with varying degrees of built-in dissimilarity. Hardware dissimilarity, for example, can be considered mandatory for any critical system elements that cannot be shown to be fully analyzable and testable. As previously noted, hardware dissimilarity can be either internal or external.

Dissimilarity is considered internal when it is part of the design of the system, including the various components, itself. An example of the use of internal dissimilarity is the known Command/Monitor architecture, whereby two independent and physically or logically dissimilar processors and associated software are configured to execute processing in parallel, using the same set(s) of input data, and their outputs are compared with each other. A failure may be declared when a deemed or otherwise significant discrepancy is detected. Another example of the implementation of Command/Monitor architecture is to configure a first processor to execute a primary set of computations, and a second processor to execute comprehensive monitor software. Dissimilarity may be induced through the use of appropriate software and/or other command signal sources in combination with redundant, similar processors, and/or by using dissimilar processors.

Units comprising internally dissimilar components tend to be more complex, and more expensive, to install and operate than non-dissimilar counterparts. Dissimilar units can be more expensive because, for example, they require duplication of development and testing, in addition to requiring the development of other functions to make the dissimilar parts work together with sensitivity yet robustness. At the current time, internally dissimilar IRUs adequate for FBW FCS application are not commercially available. Thus it may be advantageous to induce dissimilarity in otherwise similar redundant components through the implementation and use of, for example, suitably-configured processing algorithms.

External dissimilarity may be provided through the use of equivalent but dissimilar units, such as sensors designed for a single purpose and provided by different manufacturers or designers. Normally, three mutually dissimilar units are desired; some protection against generic failures can be retained when one unit is failed and voted out. Unfortunately, this approach can be expensive both for the aircraft manufacturer and customer, except where, for example, other functions require and make use of such sensors already. It requires the procurement, integration and certification of three different types of units; this triples the work. Cost per unit is also increased since one third of the overall IRU procurement volume is allocated to each unit type (negotiation power and potential for large-scale savings are lost). For the operator (i.e. customer), his inventory requires three times as many spare parts, one for each dissimilar IRU. Thus again it may be advantageous to induce dissimilarity in otherwise similar redundant components through the implementation and use of, for example, suitably-configured processing algorithms.

In processing redundant state data signals, each and/or all PFCC(s) 108 can employ one or more FDI systems 104, any one or all of which can provide or include, for example, one or more SSFD functions or systems 122. Typically, though not always, SSFD and other fault detection functions are independently applied to each type of state signal received by the PFCC(s). Such functions can begin by, for example, applying a set of checks to the data, to ensure that they are valid, and comparing the confirmed, valid data to each other, to detect faulty signals and isolate them and/or their sources.

One scheme for detecting faulty signals includes the use of majority voting. For example, a first set of checks can confirm the likely validity of input signals received by PFCC(s) 108 by comparing data represented by such signals to data representing physically possible, likely, or otherwise acceptable state parameters, and comparing signals expected to be redundant to each other, so as to determine the relative difference in them, or residue, and presuming that values deemed to be the same (where, for example, the residue between the signals is equal to or smaller than an accepted difference tolerance) are the same. If, for example, signals representing two substantially or deemed identical state parameters are received, along with a third which varies significantly from the first two, the third signal may be temporarily or permanently disregarded in providing input for CLAWs use by PFCC(s) 108.

As will be understood by those skilled in the relevant arts, it may in some circumstances be desirable to disregard state measurement signals differing from other, redundant signals by more than a designated residue threshold when controlling an aircraft or other system through suitable CLAWs only where such difference(s) in the signal(s) persists for more than a given amount of time, or persistence threshold. This can, for example, prevent PFCC(s) 108 from providing to the various control actuators of an aircraft inappropriate or undesirable command signals based on momentary anomalies, or spikes, in sensor data. In other words, such persistence can be used to reduce the possibility of false alarms. Persistence implies that a condition needs to be consecutively maintained for a specific duration of time, or number of sensor (e.g., IRU) sampling cycles before the condition is declared or otherwise considered to be an actual state condition.

As will be understood by those skilled in the relevant arts, the determination and implementation of suitable residue and persistence values may vary depending upon factors such as the state variable(s) at issue and the characteristics of the flight commands the PFCC(s) is desired to issue (e.g., passenger, military, or cargo mission; landing, take-off, cruise, high-speed, maneuver; etc.) They may further depend on deemed acceptable false alarm rates (FARs) and the impact of false alarms on the mission. For example, false detection of a generic IRU error could force the FCS into Direct Mode and oblige the pilots to land the aircraft as soon as possible; therefore, the mission would be erroneously aborted, which would be very annoying, including in financial terms, especially if it were to occur too frequently.

The definition of suitable persistence and residue values can also depend on the detection time requirement associated with a given type of error, which can itself depend on the impact of an error on the aircraft (size and criticality) until it is detected and isolated.

Persistence and residue values can be established, for example, through the use of suitably-configured simulation or other algorithms. Moreover, as is further described herein, such parameters can be defined and implemented analytically, and dynamically in real time. Using MSPRT analyses as disclosed herein, for example, and contrary to other approaches commonly used in the industry, persistence values need not be fixed a priori. In such schemes evidence of a failure is accumulated, based on the seriousness and probability of an error and its effects.

Functions provided by SSFD(s) 122 and other FDI systems 104 can also include a desired degree of data conditioning, such as for example low-pass filtering. For example, as will be understood by those skilled in the relevant arts, an FDI function may be implemented using a Mid-Value Selection algorithm (MVS): for example, for processing three redundant signals, the MVS would simply return for use in further processing the value of the signal that is bounded (above and below) by the other two (that is, the signal in the middle), at all times. So, if one and only one signal diverges due to a failure, the mid-value should not be much affected, and should remain good. This should be contrasted with the average value; a divergent signal would obviously pull the average value of three signals with it, and adversely impact the accuracy of the output.

In all cases, MVS or average, the scheme should also monitor each signal against the output to determine whether all signals are acceptably close to one another. A low-pass filter is a type of signal filter that can be implemented in analog or digital (computer) schemes, and that largely attenuates (removes) the high frequency content of a signal. Usually, the high frequency content consists of noise (i.e. vibration). Many kinds of low-pass fitters, with different characteristics of performance, are now known; they vary in their order (complexity).

Other filters, such as a Notch filter, can be used to selectively remove noise at a specific frequency in a signal. For example, the measurement of the aircraft motion can sometimes be contaminated by a mode of vibration of the aircraft structure. As such mode could be known or predictable within a certain range of frequency, a filter could selectively remove the contents of the signal at this range of frequency.

A wash-out filter is the opposite of a low-pass filter; it removes the low-frequency contents of a signal and keeps the high-frequency part. It could be used to removed signal biases and offsets, such as those produced by sensor drifts.

Other conditioning could include signal/sensor calibration to cope with scale factor errors, biases, nonlinearities, and/or signal clipping to ensure that a single corrupted value would not erroneously and annoyingly trigger a monitor. The use of signal clipping functions can be used, for example, with MSPRT implementations as described herein, as for example during the generation of "golden" data as described below. Signal clipping may also be used in computation of residues, where the maximum value of the residue would be clipped or limited to be within certain bounds.

Tasks performed by SSFD(s) 122 can include detection and isolation of random failures of one or several devices, such as IRUs 110 or other sensors 188, not already detected by the components themselves or by other internal monitoring devices; and to provide single set of "best" and validated IRS and/or other state data to the generic fault detection and isolation (IGFDI) function(s) 104, 160 (see for example FIG. 2), and eventually the flight control laws software. Such best, SSFD-validated data is sometimes referred to as "golden" data.

As mentioned previously, a generic failure can affect multiple units simultaneously. Where such a failure affects all units, FDI processes 104 would not be able to detect it by comparison of similarly-affected signals with one another. The use of suitably-configured IGFDI(s) 120 can detect such generic failures and prevent the use of inappropriate data in the application of CLAWs. IGFDI(s) 120 can be implemented as software functions executable by PFCC(s) 108 or in any other suitable manner, as for example as an Independent, specifically-designed digital and/or analog device or firmware implementation. IGFDI(s) 120 can process "golden" data from either or both of IRS 102 and (A)DMS 112, 112' once for example such golden data has been processed through corresponding SSFD(s) 118 to detect and isolate random device failures. Output of IGFDI(s) 120 can include signals indicating the detection of generic failure in the IRS or other input state data. An example of a' process of detecting and isolating generic faults in accordance with the invention is discussed in connection with FIG. 5 below.

It may be advantageous in some circumstances to optimize processing time and efficiency in the use of processing resources to provide independent SSFD functions for any or all of ADS(s) 130, IRS(s) 102, GPS(s) 126, and/or other sensor(s) 112, 188 as shown in FIG. 1.

In one aspect, the invention provides augmented DMSs (ADMSs) 112'. Each ADMS 112' can be associated with one or more corresponding AECM channels to provide to the CLAWs processor(s) 120 input signals representing state parameters such as body angular rates and/or linear accelerations in the three orthogonal axes. Such input signals can for example be provided by using an additional rate gyro for yaw rate, or simply by using a gyro triad in lieu of separate rate gyros. Similarly, three separate and orthogonally mounted linear accelerometers, or an accelerometer triad, may be used to provide signals representing accelerations in various coordinate directions. As will be understood by those skilled in the relevant arts, once they have been made familiar with this disclosure, such ADMSs 106' may be provided using a wide variety of sensors acquiring data using a variety of different locations and orientations, which may for example be computationally translated to any desired set of reference axes for the aircraft. Examples of sensors suitably for use in implementing such features of the invention include sensors available from sources such as Systron Donner Inertia, Silicon Designs Inc., etc.

In another aspect, the invention provides systems and methods for making redundant DMS data signals available to the PFCC(s) 108, and to process such redundant signals through an SSFD function 122, as similarly done for the IRS data. As previously mentioned, SSFD(s) 122 can detect and isolate random failures in the DMS not detected by separate DMS monitors, and can provide a single set of "best", or "golden" validated data to the IGFDI(s) 120. Such data can preferably be provided to the SSFD(s) 122 at the same rate as data from the IRS 102, e.g., 100 Hz. Although in some implementations it can be expected that such data are less accurate IRS to data, they can be expected to have a high level of integrity, particularly where, for example, the affected components are required or desired to be fully analyzable and testable in order to implement the direct flight control mode.

FIGS. 2 and 3 are schematic block diagrams of embodiments of system(s) 100 which can be advantageously employed in implementing various aspects of the invention. In the embodiments shown, system 100 is an FCS system comprising inertial reference systems (IRSs) 102, PFCCs 108, FDIs 104, and augmented or compound DMS sensors 112, 112'. For purposes of this paragraph, the embodiments of system 100 shown in FIGS. 2 and 3 can be interpreted as simplified and generalized versions of the embodiment of system 100 shown in FIG. 1. In FIGS. 2 and 3, DMSs 112 represent for example conventional pitch and yaw rate gyros; compound sensors 106 comprise such DMSs 112 in combination with other sensors 114. In the disclosure herein, unless otherwise clearly required otherwise by the context, the term "DMS" can mean either one or more DMSs 112 or one or more augmented sensors 112'.

Figure 4:
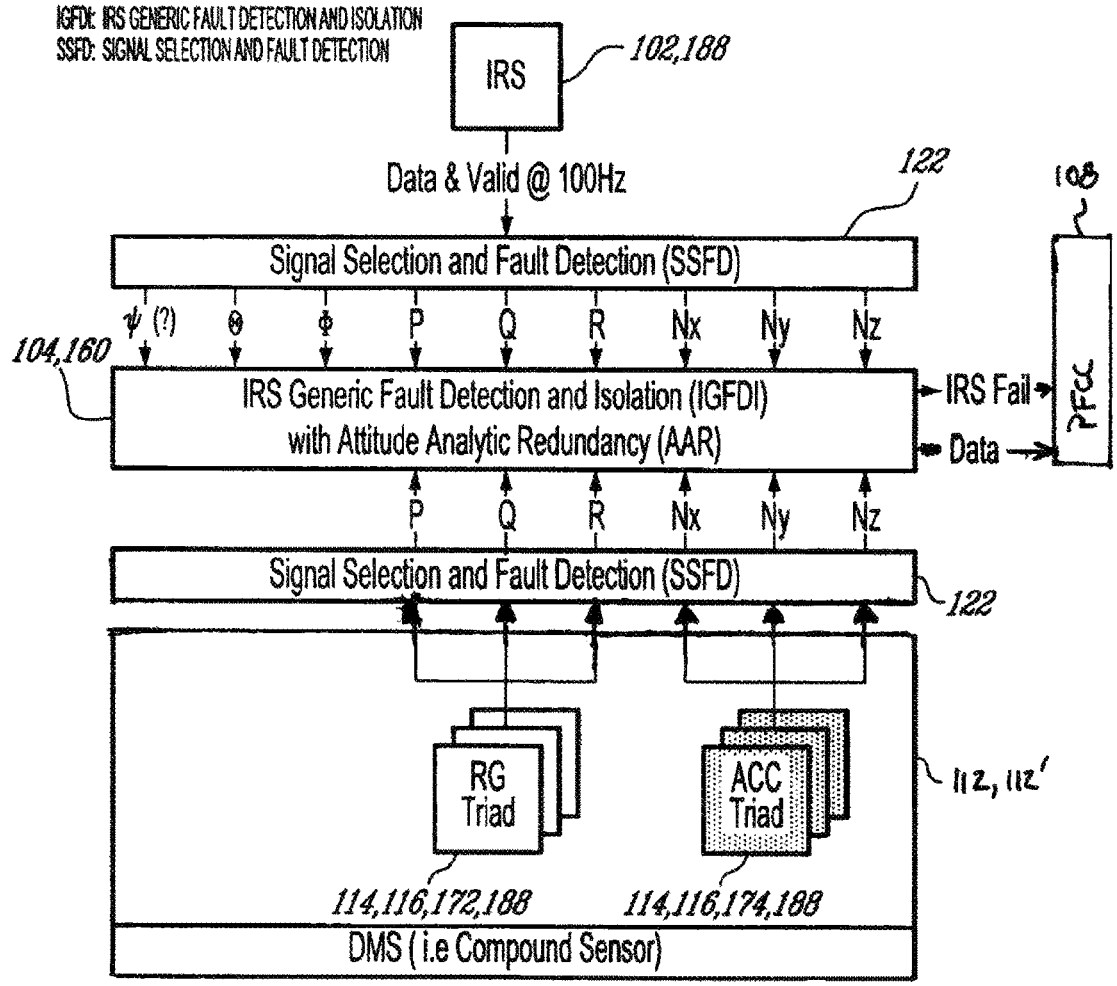

An example of processing of data provided by IRS(s) 102 and (A)DMS(s) 112, 112' for detection and isolation of generic faults in accordance with the invention, prior to providing state data for processing by PFCC(s) 108 according to CLAWS, is shown in FIG. 4. The process shown in FIG. 4 is suitable for implementation by, for example, the systems 100 shown in FIGS. 1-3.

State data provided by IRS 102 to SSFD 104, 122 can represent the three components of linear acceleration (Nx, Ny and Nz), the three body angular rates (P, Q and R), and two of the three attitude angles, roll (or bank) and pitch angles $\Phi$ and $\theta$, respectively. The yaw (or heading) angle can also be included, although it is less frequently used by currently-conventional CLAWS algorithms. Data representing all or a desired subset of such state data, as for example the three components of linear acceleration (Nx, Ny and Nz) and three body angular rates (P, Q and R) can be provided also by one or more DMSs 112, using devices such as rate gyro triad 172 and acceleration triad 174. Data provided by IRS 102 and DMS(s) 112 can be compared using IGFDI 104, 120, as described herein.

Thus the invention provides, for example, a fly-by-wire flight or other vehicle control system 100 comprising at least one Inertial Reference System (IRS) 102 comprising a plurality of Inertial Reference Units (IRUs) 110; at least one IRS Generic Fault Detection and Isolation (IGFDI) module 122. 160 for performing signal selection and fault detection on signals generated by the at least one IRS representing vehicle state data; at least one ADMS suite 112' that is a Direct Mode Sensor (DMS) suite 112 augmented to generate signals representing independently-acquired vehicle state data corresponding to least a subset of the signals generated by the IRS 102; wherein the IGFDI also performs signal selection and fault detection on signals generated by the augmented DMS suite.

In various embodiments of the invention analytic redundancy based on vehicle angular kinematics is used to supplement or create dissimilarity in various sensors, thus simplifying the design and parts count, reducing cost and system weight, and improving system availability.

Figure 6:
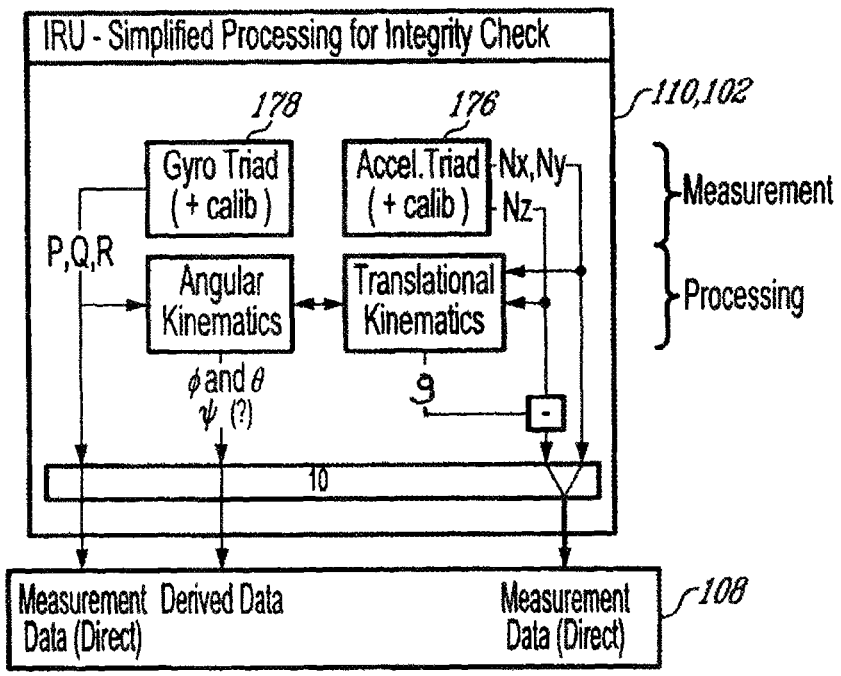
FIGS. 6 and 7 are schematic diagrams of embodiments of processes for processing vehicle state data in accordance with the invention.

A further aspect of the invention is discussed in connection with FIG. 6, which provides a schematic illustration of an embodiment of processing of data by an IRU 110. An IRU 100 can for example measure the specific force vector Nx, Ny, Nz using a triad of three orthogonal accelerometers 176. The specific force is the combination of inertial acceleration and acceleration due to gravity. IRU 100 can apply various processing algorithms to the basic force measurement data to improve their accuracy; e.g., the sensor measurements may be corrected for temperature effects, or other nonlinearities or imperfections in the sensors or attached measurement systems may be accounted for. The resulting "calibrated" measurements may be integrated as part of the translational kinematics to provide aircraft speed and position for use by PFCC(s) 108 in applying CLAWs. Calibrated longitudinal and lateral specific force measurements may be output essentially without additional processing, or where desired some sort of conditioning such as low pass filtering, etc. However, the vertical component of acceleration is typically considered to be biased; i.e. the local vertical component of acceleration due to gravity estimated from the current position of the aircraft and altitude is often subtracted out prior to being output to the PFCC(s) 108. Such additional processing typically must be compensated for when this signal is compared to its (A)DMS counterpart, which generally undergoes no such processing, in order to avoid providing falsely high residues. It may be necessary in addition to consider some other compensations if the IRUs 110 and (A)DMSs 112, 112' are located in significantly differing positions in the vehicle and/or vehicle angular motion is significant; i.e. the measurements may have to be corrected for angular and centripetal acceleration proportionally to the distance between the various sensors.

The same or one or other IRUs 110 can measure other vehicle body state variables, such as angular rate vector P, Q, R, using for example orthogonal rate gyro triad 178. As for the specific force measurements, various types of processing may be applied to compensate for raw sensor imperfections, and for physical phenomena such as earth rotation, etc. The resulting "calibrated" measurements may be output, and processed to resolve (i.e. integrate) the angular kinematics and so provide an estimate of aircraft attitude, which is output as the three attitude angles, roll (or bank), pitch and yaw (or heading), as desired. Vehicle attitude may also be used to resolve the translational kinematics mentioned above.

As previously noted, a feature of the invention includes basic operation of the IGFDI 120: first, a direct check of corrected acceleration measurements and body rate measurements provided by IRU(s) 110 using independent (A)DMS sensor(s) 112, 112', and second, given that the IRU or IRS (i.e. consolidated from the operating IRUs) body rates have just been validated, a consistency check of the attitude angle variations with estimates computed by the IGFDI 120 based on the angular kinematics. In so doing, one can think of the IGFDI 120 as a dissimilar implementation of the angular kinematics compared with the IRU 110. Performance is not affected by the lower quality of the (A)DMS 112, 112' as accurate IRU rates are being used.

Figure 7:
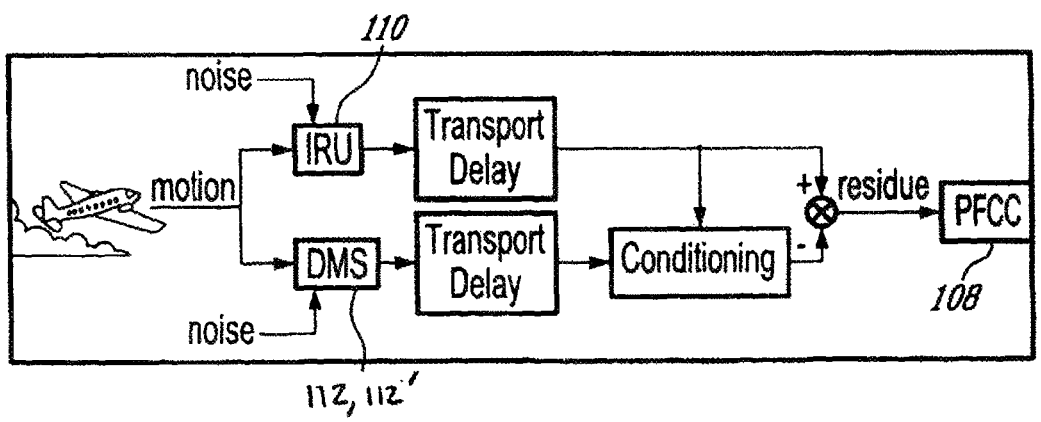

In other aspects the invention provides systems and methods for comparing various forms of redundant state data to one another. Such comparisons may advantageously be applied independently to each set of corresponding signals. The operation of comparing two signals comprises studying their difference, or residue (i.e. if two signals are equal, then their residue is zero). Determination and use of state variable residues in accordance with the invention is explained in connection with FIG. 7.

In the case of linear accelerations Nx, Ny, Nz, and assuming that the IRUs 110 and (A)DMSs 112, 112' are sufficiently close to one another, or that differences in body angular acceleration and velocity vectors are sufficiently small, the residues can be simply taken as the difference between the two measurements (except in some circumstances for the vertical acceleration, which for many forms of CLAWs implementations needs to be unbiased: i.e. the local value of the vertical acceleration due to gravity must be added to the DMS vertical acceleration measurement, or subtracted from the IRU vertical acceleration measurement. This value does change as a function of aircraft position and altitude, but an approximate constant value is normally sufficient, if the error created by this approximation, and translated into a residue bias, is taken into account in the determination of the monitor threshold).

If conditions for neglecting the distance between the IRUs and (A)DMSs are not satisfied, then compensation for body angular accelerations and centripetal accelerations may be required. Suitable means for compensating for such differences are well known, using, for example, the laws of kinematics and rigid and/or non-rigid body dynamics.

For the angular rates P, Q, R, the residues may simply be taken as the differences between the IRU and DMS measurements.

For each attitude angle $\Phi$, $\theta$, and optionally $\Psi$, the residue may be taken as the difference between the variation in the IRU attitude angle between two sample times and the estimated variation in attitude based on the integration of the IRU angular rates in the PFCC(s) 108 over the same time period, or more specifically in the IGFDI 120. Suitable relations for making such determinations are well known, and include for example those provided in the NASA F8-DFBW report disclosed herewith, the contents of which are incorporated by reference. The equations provided in that study have the useful characteristics that the derivative of an attitude angle is not expressed as a function of the attitude angle itself.

The attitude angle residues defined above correspond to differences in the attitude angle time derivative, and not in the attitude angles themselves. For optimum performance, this puts an emphasis on data consistency and on the rate of change or drift in data instead of on of the value of the angles themselves. This may, for example, provide a sufficiently high level of protection against generic failures.

In alternative embodiments, estimated attitude angles $\Phi$, $\theta$, and $\Psi$ can be used in addition to, or as a replacement for, measured values even in cases where no additional attitude and heading reference sensors are provided. Once the accelerations Nx, Ny, and Nz have been validated, they can be used to estimate the orientation of the gravity vector relative to the aircraft and hence provide an estimate of the aircraft attitude, i.e. roll (i.e. bank) and pitch angles $\Phi$, $\theta$. However, such computations are only accurate when perturbations due to the vehicle's acceleration are small, as the IRUs 110 typically measure specific force, which is the vector addition of aircraft acceleration and gravity. Therefore, one might choose to generate a residue only when the magnitude of the acceleration vector measured by the IRS would be sufficiently close to that for gravity (i.e. when vehicle acceleration is sufficiently small). In many types of vehicle dynamic applications, this is likely not to produce residues at a fixed sample rate (as there will be period over which processing could be momentarily suspended). If this is a problem, then one could create by computations from the acceleration measurements, and using low pass filtering, the equivalent of a clinometer, or even a vertical gyro if some angular rate information is used. Such a virtual sensors based on analytic redundancy could then provide low but sufficiently accurate attitude angle estimates at a fixed sample rate for generating residues periodically.

In further aspects, the invention provides systems, methods, and algorithms that process state data for use by CLAWs by considering the problem of detecting failures in data acquisition devices 110, 106, etc., as a stochastic process. It can be assumed, for example, that a sequence of residues, whether generated periodically or not, is similar to a white Gaussian noise sequence. In some embodiments, for example, the monitor design may be based on such assumptions, and will work optimally if the stochastic assumption is satisfied. Monitor performance degradation could occur in such circumstances if the assumption were not approximately satisfied.

The assumption that the process is stochastic implies that residues are normally distributed with a given mean (or bias) and standard deviation (or noise). Being "white" implies that the residues are uncorrelated (not significantly correlated). Studies of actual flight-test-data-derived residues, for various test aircraft types, in different configurations, flight conditions and flight phases, and based on various types of inertial sensors, have justified this assumption. They have also shown that the residue noise is dominated by the environment seen by the sensors (e.g., vibrations), and is less dependent on inherent sensor measurement noise. This implies that for a monitor design the noise level of the sensor output should be experimentally determined; i.e. it cannot really be easily predicted from the characteristics of the sensor alone. Flight test data has also shown that noise level is greatest during takeoff, approach, and landing phases, when high-lift devices (e.g. flaps and slats) are deployed. Therefore, embodiments of the invention can use single (preferably the largest) values for the standard deviation, or two or more values based on the deployment of the high lift devices (e.g., flap setting). A more complex implementation could be used to estimate the current noise level on-line, and adjust the parameters of the monitor in real time as a result. If necessary, the corresponding state data sampling period(s) could be increased to reduce the autocorrelation of the residues.

As those skilled in the relevant arts will appreciate, however, that the present invention will work equally well in using residues that have a non-normal distribution, or are slightly colored (i.e. correlated), and most relationships that are derived for this particular case would apply with no or minimum changes.

Figure 8:
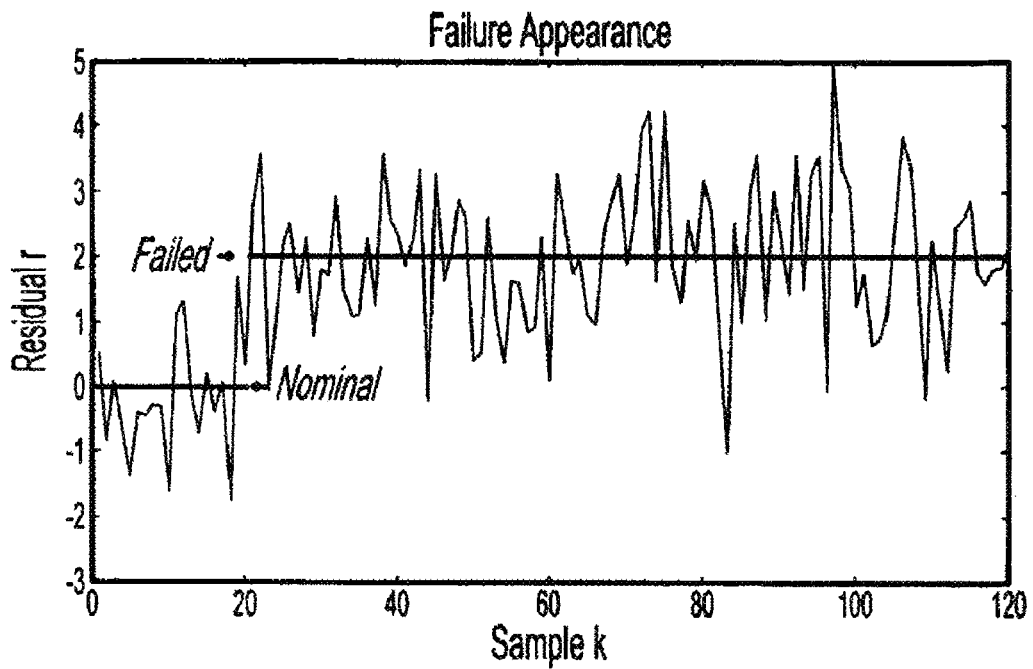
FIG. 8 is a plot of example data residues determined in accordance with the invention.

An example of residue sequences determined for a number of sequentially-acquired redundant state data values is shown in FIG. 8. For the nominal or normal case in which no failure is present, the residue mean should, as shown, be close to zero. However, when certain types of failure occur, then the residue mean may take a significant value. Alternatively, a failure may result in a change in the observed noise amplitude (e.g., a superimposed oscillation failure), or in both a bias and a change in the noise amplitude. The present invention focuses primarily on the bias case, but, as will be understood by those skilled in the relevant arts, it could deal equally with the other cases, using minor changes in the formulation—most performance equations to derive the design parameter values remain the same. For example, while the detection of failures that can be represented by an offset or bias require residues based on the differences between the measured or estimated values of the parameter of interest from two different sources, residues associated with an unacceptable change in the noise or standard deviation (e.g., could be symptomatic of an oscillatory failure) would simply be taken as the square of the previous residues.

For purposes of the present explanation, it can be assumed that a failure would manifest itself as a bias, thus one objective of the FDI 104 is to detect such biases. Note that various failure types will manifest themselves as a bias, so that various embodiments of the invention are effective in detecting many different failure types. For example, a scale factor error would typically lead to a significant bias during maneuvering flight when the signals to be monitored take sufficiently large values; smaller values of the signals would result in small biases that would likely be deemed within acceptable levels of tolerance. Other failure modes, such as, for example, dead sensor, sensor hardover or slow drift after a certain time could similarly be captured as a bias. Otherwise, it is possible in many cases to formulate residues that would capture a failure mode in such a way as to correspond to a bias (or to a change in noise level). The present invention allows any number of suitable tests to be implemented in parallel.

A further feature of the invention is the use of the Modified Sequential Probability Ratio Test (MSPRT), in conjunction with suitable sensors 110, 112, 188, etc. and suitably-configured PFCC(s) 108, to detect sensor failures. The MSPRT was developed by T. T. Chien (see "An Adaptive Technique for a Redundant-Sensor navigation System", Sc. D. Thesis, M.I.T., February 1972) based on A. Wald own Sequential Probability Ratio Test (SPRT) (*Sequential Analysis*, Wiley, New York, 1947). While, as explained herein, the MSPRT is an advantageous algorithm for use in detecting sensor failures, other ways to detect failures are both possible pursuant to and suitable for use as alternative or additional algorithm features in implementing the invention. Such algorithms include, for example, those used in simple residue threshold monitoring, in conjunction with the use of suitable persistence criteria as described herein.

The SPRT implements hypothesis testing in a sequential manner; i.e. the number of data points to be considered in taking a decision as to whether a failure has occurred is not known a priori, but depends on the data itself. Two hypotheses may be defined. H0 is the hypothesis that the situation is normal; i.e. that no degradation in sensor or data quality has occurred. In this case, assuming that a degradation will manifest itself as a bias, the residue sequence should be normally distributed (in the mathematical sense) with a zero mean. The alternate hypothesis H1 describes a failure situation whereby residues are normally distributed with a given bias manifesting itself as a mean of value b1 and indicating failure.

Figure 9:
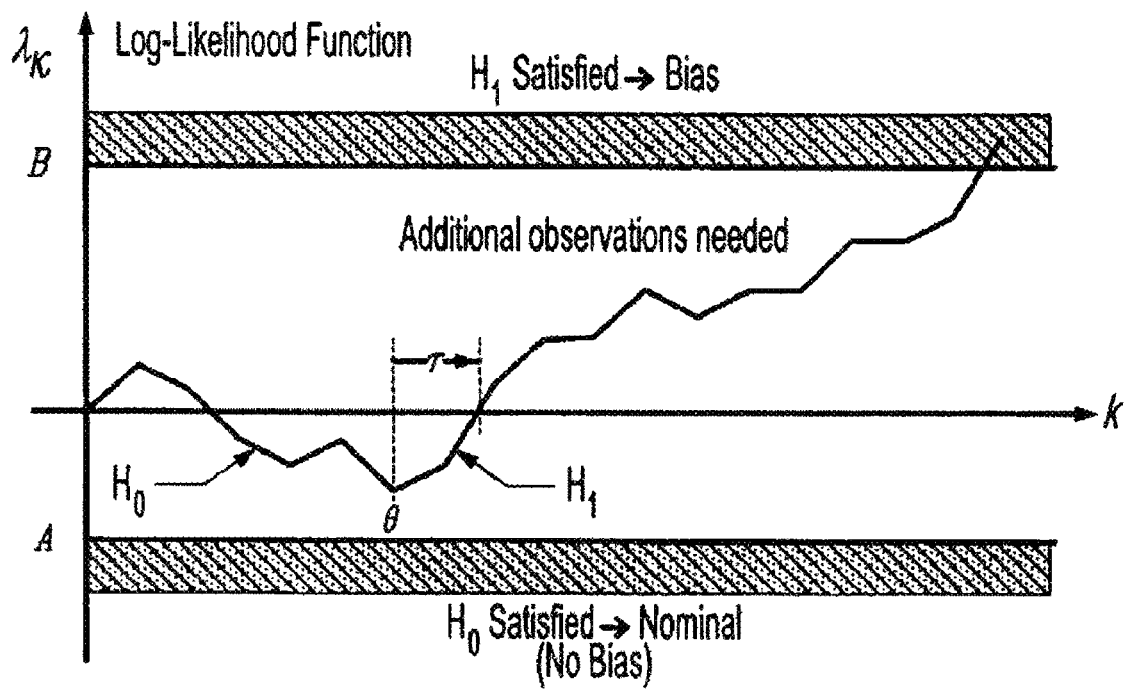
FIGS. 9 and 11 are plots of likelihood-of-failure functions $\lambda_k$ used in examples of embodiments of methods of failure detection in accordance with one aspect of the invention.

An implementation of the SPRT-test is explained in conjunction with FIG. 9, which is an exemplary plot of the likelihood of failure $\lambda_k$ as a function of a determined tolerance level of residue value and the number of samples analyzed. For each corresponding set of redundant data samples the value of the log-likelihood ratio $\lambda_k$ is computed. This function is the logarithm of the ratio of the probability of having observed the actual set of residues under hypothesis H1 over the same probability but under H0. At each new data point, three decisions can be taken. Hypothesis H1 (a degradation has occurred) is selected as true if the log-likelihood ratio exceeds a certain threshold B (positive). Erroneously selecting this hypothesis yields a so-called type I error of probability $\alpha$, which may be thought of as a false alarm. Alternatively, hypothesis H0 (situation is normal, no degradation has occurred) is selected as true if the log-likelihood ratio is smaller than a second threshold A (negative). Erroneously selecting this hypothesis yields a so-called type II error of probability $\beta$, which may be thought of as a missed failure detection. Finally, if the log-likelihood ratio falls between these two boundaries, then there is not enough information available in the set of observed data to make a decision with the error bound, and a new observation is made. The process stops when a decision is made, i.e. the log-likelihood ratio crosses one of the two boundaries. It can be shown that one boundary will be eventually crossed when the actual bias is different from $b_1/2$.

Values for thresholds A and B shown schematically in FIG. 9 can for example be related to the probability of errors $\alpha$, and $\beta$. An interesting and useful feature of the use of the SPRT or MSPRT algorithms in applications according to the invention is that the step size on the log-likelihood is proportional to the size of the residue. Typical prior art algorithms used in integrity monitors use constant step sizes. Moreover, persistence, or the time before a decision can be taken to satisfy the probabilities of making errors of the types discussed above, is not fixed a priori, contrary to other prior art. Use of the SPRT or MSPRT algorithms allows decisions to be taken in the minimum amount of time while guaranteeing the error probabilities.

It has been shown that the SPRT test described above is highly efficient, and even optimal, in a variety of circumstances, because it typically enables a fault/no fault decision to be based on a minimum number of observations, and therefore, for any given sampling rate, in a minimum amount of time, which, as will be understood by those skilled in the relevant arts, can be highly advantageous in many vehicle control applications. As, for example, the IRS is often flight critical, it is generally important to avoid false alarms that would create an unacceptable nuisance by forcing the FBW FCS into Direct mode, and to detect a problem as quickly as possible because the controllability of the aircraft or other vehicle may be at stake; this test satisfies each of these requirements. Other types of statistical tests could be considered, but then the relationships between threshold values and performance (false alarm rate and missed detection) can be more difficult to obtain. Values of A and B suitable for use in implementing the SPRT in accordance with this feature of the invention may be determined in accordance with The Wald or Chien references. A and B can be related, for example, to the probability of errors of type I and type II: $B \leq (1-\beta)/\alpha$ and $A \geq \beta(1-\alpha)$ respectively. In practice, the equality may be retained to establish the threshold values.

The assumption that residues occur in distributions corresponding to white Gaussian noise results in a very simple expression for the log-likelihood ratio, or its expression as a difference expression. This is true even if the hypotheses to be tested concern the value of the standard deviation instead of (or in addition to) a bias.

Figure 10:
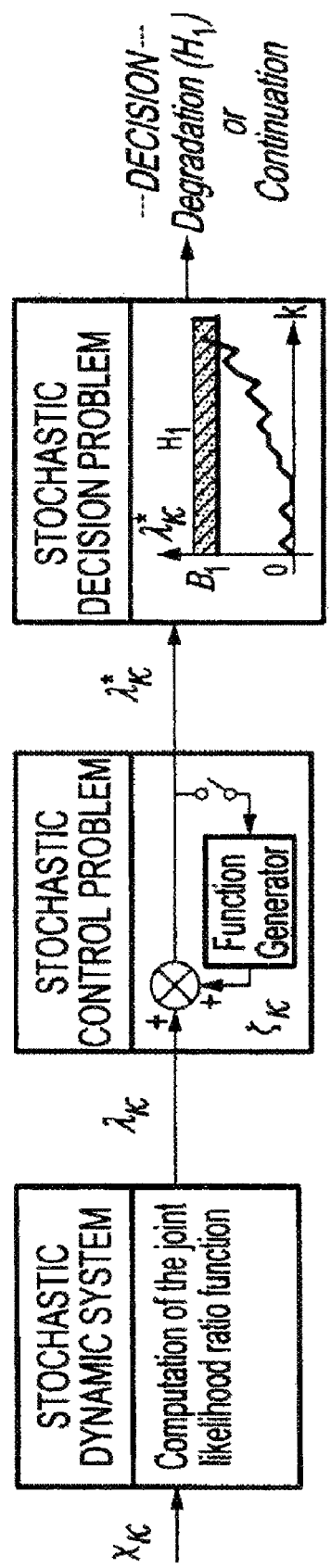
FIG. 10 is a schematic diagram of an MSPRT method suitable for use in implementing aspects of the invention.

The continuous form of the log-likelihood ratio function stochastic behavior can be shown to be a Wiener process (i.e. Brownian motion), even in cases where the residues would not be normally distributed. Brownian motion has been extensively studied, and the problem of first passage through a boundary such as threshold levels A and B of FIG. 9 has been solved, with and without absorbing boundaries. Such solutions can be used to further relate the thresholds to the Mean Time Between 2 False Alarms (MTBFA), which is itself related to the false alarm rate, and Mean Detection Time (MDT), which is related to the missed detection rate or probability, to the other parameters, such as bias, noise, and sampling period. Assuming a continuous process, the various statistical distributions can also be obtained. Therefore, all elements exist to establish a design process. Note that the preferred application is by software on a digital computer and is therefore discrete. Therefore, some correction may be applied to the design parameters to reduce the so-called effect of overshoot. An overshoot occurs in the discrete case because the test is stopped after the boundary has been crossed instead of at the very moment it is attained in the continuous case. Note however that not applying overshoot compensation simply makes the MTBFA significantly more conservative without substantially increasing the detection time. Such a test was used in the NASA F8-DFBW program described above. In the case where no failure is present, the log-likelihood ratio will generally drift toward the lower boundary at which time a normal situation will be declared. The system can be reset and the test restarted. As can be seen in FIG. 10, if a failure occurs at a time $\theta$ when the log-likelihood ratio $\lambda_k$ has already migrated toward the lower boundary A by a significant distance, then detection of the failure is penalized by an amount of time $\tau$ consisting of the time needed for the log-likelihood ratio to cross the zero value. Moreover, the interest is often more in the detection of a failure than in confirming that a system is functioning nominally.

For these and possibly other reasons, T. T. Chien addressed the problem using optimal control and derived the MSPRT. He showed that a suboptimal version of the test could provide a level of performance very similar to the optimal version, yet be relatively simple to implement. A schematic diagram of an MSPRT method suitable for use in implementing corresponding aspects of the invention is illustrated in FIG. 10.

The only implementation difference over the SPRT is the reset of the log-likelihood ratio when negative. That is, information to the effect that the system is operating nominally is not cumulated. In this way, as soon as a failure occurs, evidence of the failure starts to be cumulated, providing an improved detection time. Expressions relating the MTBFA and Mean Detection Time (MDT) have been provided by, for example, Chien.

Additional features of the invention include modification of such expressions to account for the existence of biases in the normal situation, to derive expressions for the detection time statistical distribution, and to define a so-called $\alpha$-level detection time, which provides a detection time guaranteed to be exceeded less than $\alpha$% of the time. The latter is illustrated in connection with FIG. 11.

Figure 11:
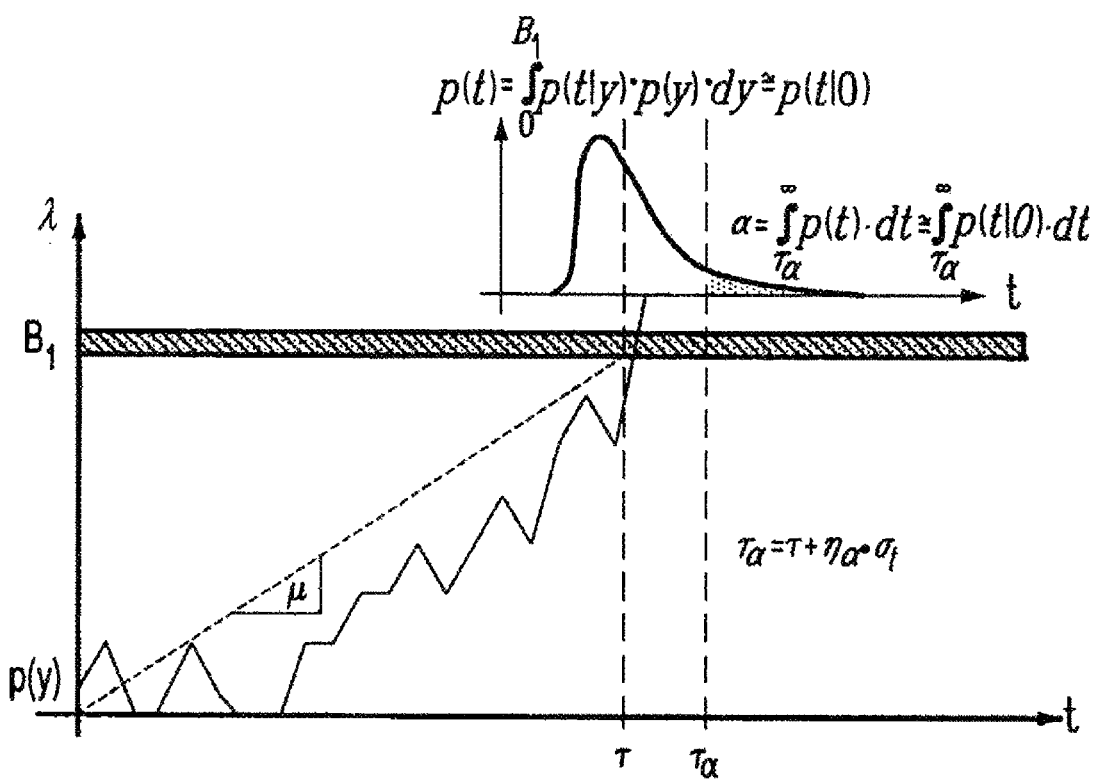

Essentially, detection time distribution in accordance with this aspect of the invention combines two random effects. The first effect arises from the fact that, even in the normal situation (no failure), the log-likelihood ratio $\lambda_k$ needs to be described by a statistical distribution due to the stochastic nature of the residues or observation process. Therefore, when a degradation or other failure occurs and evidence of the failure starts to cumulate, the initial value (or condition) of the log-likelihood ratio $\lambda_k$ also needs to be described by a distribution. The second effect is that evolution of the log-likelihood ratio $\lambda_k$ is similar to Brownian motion, and the migration time to a boundary, or the time of first-passage, also is advantageously described by a distribution. This is illustrated in FIG. 11.

Figure 12:
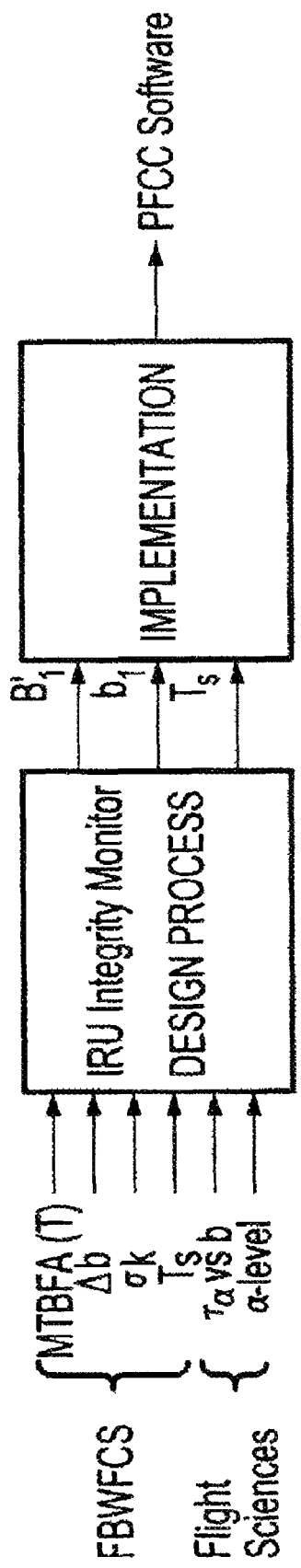
FIG. 12 is a schematic diagram of a design process suitable for use in implementing aspects of the invention.

Design and implementation processes in accordance with this aspect of the invention may proceed as illustrated in FIG. 12. Typically, performance and implementation requirements can be provided by two development groups of a vehicle design team, say for example an FBW FCS group responsible for the system architecture, and a Flight Sciences group responsible for the CLAWS design to provide for and maintain desired handling qualities. The FBW FCS group can provide the required MTBFA, the largest expected residue bias in the normal mode, the residue standard deviation, and the sampling period. The Flight Sciences group can provide the performance requirements as a set of Detection Times vs. Bias (that is, how much time can the system tolerate a given failure-equivalent bias) and its associated α-level, i.e. the acceptable probability for the actual detection time to exceed the required detection time. From such input parameters the design process can produce the MSPRT scaled threshold $B'_1$ and design bias $b_1$. These, together with the sampling period, are the only parameters needed to complete the implementation.

Figure 5:
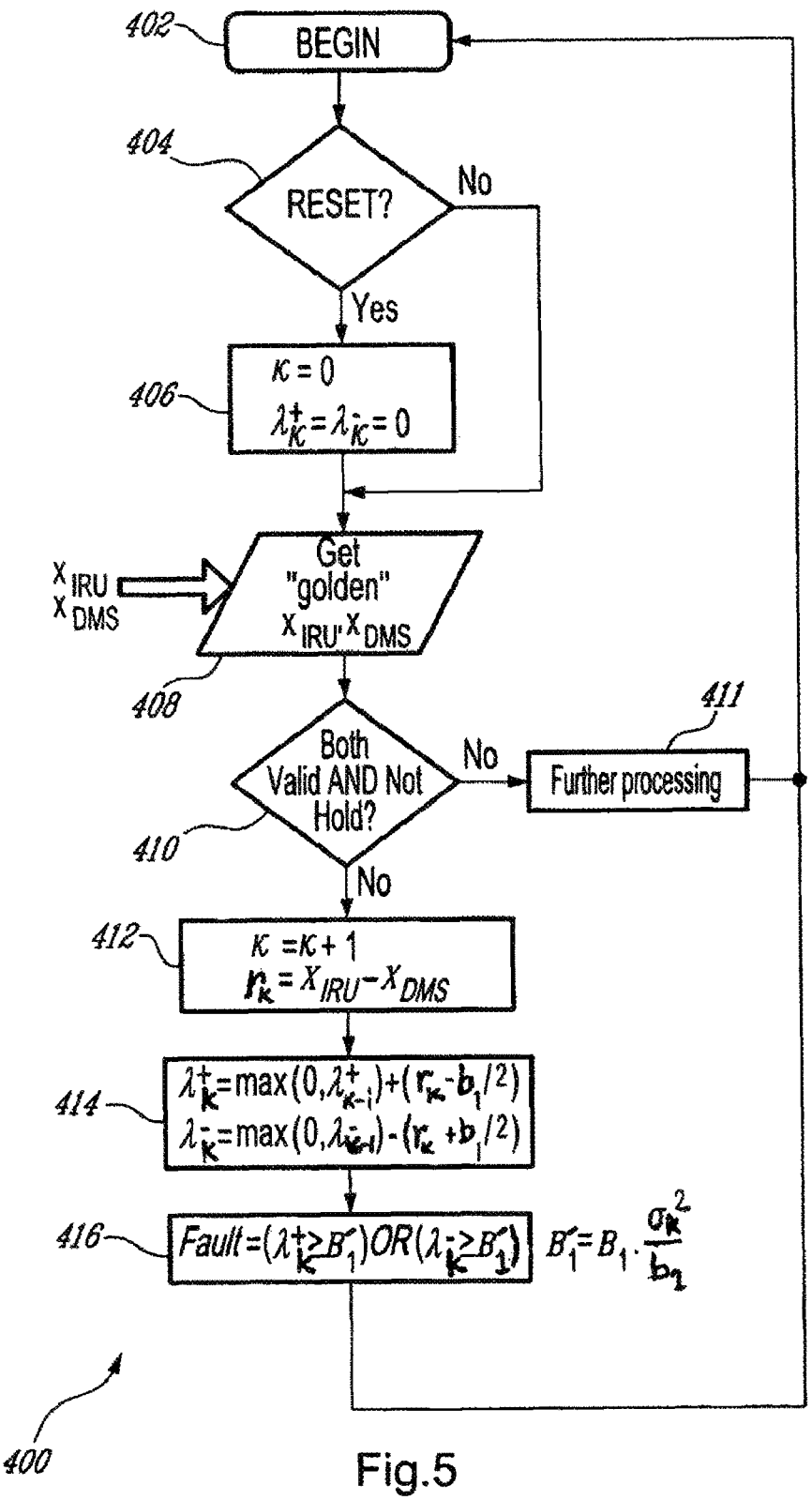
FIG. 5 is a schematic flow diagram of an embodiment of a process for monitoring the integrity of one or more inertial reference units in accordance with the invention.
Figure 13:
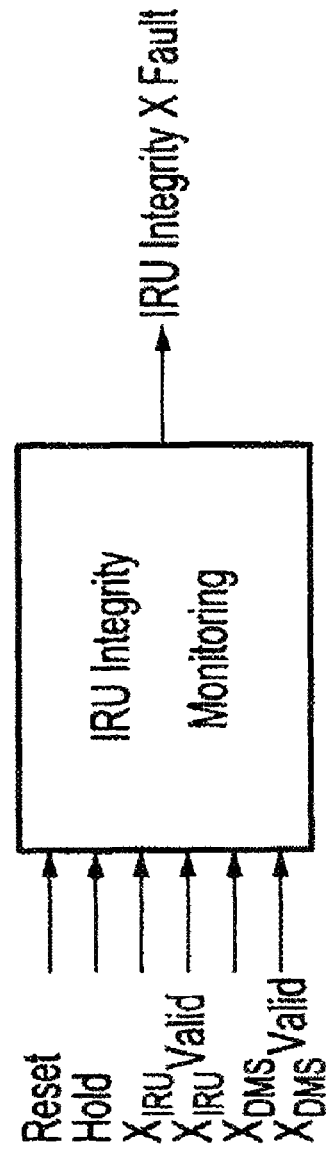
FIG. 13 is a schematic diagram of a fault detection process suitable for use in implementing aspects of the invention.

An example of a digital implementation of use of an MSPRT method by an FCS 100 and in particular, for example, by an IGFDI 120 of a PFCC 108, for detecting either positive or negative bias in accordance with the invention is illustrated in FIG. 13 and in FIG. 5. In many such embodiments it is advantageous to provide at least one such monitor process 400 for each pair of state data signals to be checked using the IGFDI 120. Each monitor process 400 can itself implement several tests in parallel.

As shown in FIG. 5, the two data elements to be compared can comprise or otherwise be associated with a value and an associated validity indicator (such as a validity flag variable); the test may be temporarily suspended in case one of the two data elements is invalid. Reset and Hold signals can provide explicit monitor controls for reset and hold functions; for example, a Hold signal can disable an acceleration monitor in case of large angular accelerations or angular rates, if, for example, no compensation of the (A)DMS measurement(s) is implemented in the case of significant distance between the sensors to be compared. A Hold signal can be used, for example, to disable a monitor process 400 during an exceptional operation such as a take-off run on a rough runway, in order to prevent false alarms, as the actual residue, noise parameter may have been selected to be small to provide high sensitivity and fast response time in other phases of flight. A Reset signal can be useful for, for example, test purposes, or upon detection of a lightning strike that may have affected the corresponding sensors 112, 110, etc., in such a way as to have had triggered the monitors.

In the example implementation provided in FIG. 5, two MSPRT processes are performed, one for each of a positive and negative bias of predetermined amplitudes. A useful feature of the invention is its simplicity and the very limited computing power required (a few addition and comparison operations are required for each test). As mentioned earlier, other implementations are possible (to maintain, for example, simplicity in implementation). Moreover, several tests can be performed in parallel.

Process 400 of FIG. 5 is suitable for implementation by, for example, any of the systems 100 shown in FIGS. 1-3. For example, at 402 an IGFDI process 104, 120 can initiate a process 400 by initializing any required variable values (e.g., by storing values of 'zero' in corresponding memory(ies)) and confirming that required input devices 110, 112, etc., and/or volatile or persistent memory devices are available and responding to suitably-configured check signals provided by, for example one or more processors associated with PFCC(s) 108.

At 404 a determination can be made as to whether any previously-determined criteria calling for the resetting or re-initializing of the same or any further variables has been satisfied. As previously mentioned, such criteria can be adapted for resetting the process 400 in the event of lightning strike or other exceptional occurrence. If any such criteria have been satisfied, at 406 one or more corresponding sample counters k, and values for log-likelihood ratios $\lambda_k^+$ and $\lambda_k^-$ corresponding to positive and negative biases, respectively, corresponding to one or more sets of state data samples to be monitored compared can be reset to zero, or to other desired number(s). For example, processor(s) of PFCC(s) 108 can reset data registers associated with separate variables k, $\lambda_k^+$ and/or $\lambda_k^-$ associated with any or all desired state values Nx, Ny, Nz, P, Q, R, Φ, θ, and/or Ψ to be monitored. When any desired values have been reset, processor(s) associated PFCC(s) 108 can cause logic control to skip from 404 to input or data reading process 408.

If at 406 it is determined that no criteria for resetting of the values k, $\lambda_k^+$ and/or $\lambda_k^-$ have been satisfied, processor(s) associated PFCC(s) 108 can cause logic control to proceed to input or data reading process 408 without resetting any values k, $\lambda_k^+$ or $\lambda_k^-$.

At 408 putatively redundant 'golden' data sets representing vehicle state data can be accessed by the processor(s) of PFCC(s) 108. Such data can, for example, be acquired by one or more of sensors 112, 110, 188 and validated by one or more of SSFD(s) 122, as described herein, and held in volatile memory and/or stored in persistent memory for use PFCC(s) 108. For example, a primary value $X_{IRU}$ representing one of the state variables Nx, Ny, Nz, P, Q, R, Φ, θ, or Ψ can be read or otherwise provided by one or more IRU(s) 110, along with a corresponding secondary or check value (i.e., a redundant value) $X_{DMS}$ associated with the same state variable and provided by a secondary sensor such as a (A)DMS 112, 112', or other sensor 188. Normally, such data would be the output of the SSFD that would have processed the IRS data comprised of the data from the redundant IRUs.

The SSFD could vote out, or otherwise neglect, data from IRUs that are judged randomly failed. Note that IRUs can detect and report some of their random failures via their own internal monitoring. Such failed IRUs would be ignored by the SSFD.

At 410 'golden' data accessed at 408 can be analyzed to determine whether an immediately-apparent invalid condition in the data, Indicating immediate failure, or a "Hold" condition such as one or more of those described above applies. For example, a processor of PFCC(s) 108 can determine whether one or more of sensors 112, 110, etc., has stopped responding, or if the aircraft or other vehicle is in an exceptional condition in which the accessed data is to be temporarily ignored, as for example during the rough takeoff condition described above.

If at 410 a determination is made that the data are either not valid or are subject to a 'Hold' condition, at 411 further processing can be undertaken. For example, PFCC(s) 108 can apply the 'Hold' condition for a temporary and preferably predetermined period of time (e.g., long enough for a 'rough takeoff' or other condition to abate), and/or a sensor 112, 110, 188 etc., associated with a declared fault state can be shut off or otherwise removed from consideration in further processing. When such further processing has been completed, control can be returned to 404 for processing according to process 404 et seq.

If at 410 a determination is made that the data is both valid and not subject to a 'Hold' condition, at 412 sample counter k can be incremented, as implied by reference to, for example, FIG. 9, and a residue $r_k$ corresponding to each read state variable Nx, Ny, Nz, P, Q, R, Φ, θ, or Ψ (or ΔΦ, Δθ, or ΔΨ if expressions based on analytic redundancy are used as described above) can be calculated, as for example using the suitably-programmed, stored, and accessed relation:

$$r_k = X_{IRU} - X_{DMS}$$

At 414 values of the positive and negative likelihood ratios $\lambda_k^+$ and $\lambda_k^-$ associated with the current data set(s) can be determined, using, for example, the suitably-programmed, stored, and accessed relations:

$$\lambda_k^+ = \max(0, \lambda_{k-1}^+) + (r_k - b_1/2)$$

$$\lambda_k^- = \max(0, \lambda_{k-1}^-) + (r_k + b_1/2)$$

Where $b_1$ represents the design bias associated with the corresponding sensor 106, 110, etc., and/or state variable.

At 416 log-likelihood ratios $\lambda_k^+$ and $\lambda_k^-$ can be used to determine whether a 'Fault' condition exists or should be declared. For example, using a suitably-programmed, stored, and accessed representation of the relation:

Fault declared if: $(\lambda_k^+ \geq B'_1)$ OR $(\lambda_k^- \geq B'_1)$ where:

$$B'_1 = B_1 * (\sigma_k^2 / b_1)$$

and B1 is the selected value for the upper threshold B: b1 is a designed or otherwise selected bias linked to the size of error to be detected; $\sigma_k$ is the estimate of the residue noise (standard deviation). The subscript k indicates that σ is the standard deviation for a discrete sequence, not the standard deviation of the equivalent continuous process. The subscript also indicates that this parameter could be adjusted as a function of the flight phase (but so would $B_1$).

In an alternative implementation in which absolute values are be used in computing $r_k$, only the expression $\lambda_k^+ = \max(0, \lambda_{k-1}) + (r_k - b_1/2)$ would need to be used. The sign superscript applied to lambda would then disappear. As mentioned previously, similar expressions could be used to detect other types of failures such as increased noise (oscillation).

In the event no fault is declared at 416, control can be returned to 404, where the decision to reset any or all values and subsequent processing of process 404-416 can be resumed.

Thus the invention provides, for example, a method of controlling an aircraft or other vehicle performed by one or more data processors configured to provide command signals to one or more vehicle control devices, the method comprising: receiving from at least one Inertial Reference System (IRS) comprising a plurality of Inertial Reference Units (IRUs) signals representing vehicle state data; receiving from at least one Augmented Direct Mode Sensor (ADMS) 112' signals representing independently-acquired vehicle state data corresponding to least a subset of the signals received from the IRS; performing signal selection and fault detection processes on the signals received from the at least one IRS and on the corresponding signals received from the ADMS; based at least partly on the signal and fault detection processes, determining whether at least one component of at least one of the IRS and ADMS is in a fault condition; and based on the determination whether the at least one component is in a fault condition, providing to at least one vehicle control system device one or more vehicle control command signals.

The specific embodiments and implementation details that have been disclosed above for each of the various features of the invention have been presented by way of example. Modifications to these implementation details can be made without departing from the scope of the present invention. For example:

Individual rate gyros can be use instead of triads.

The number of rate gyros (i.e. the redundancy level) can be varied.

Individual accelerometers can be used instead of triads.

The number of accelerometers (i.e. the redundancy level) can be varied.

The IRS Generic FDI can be restricted to use with respect to accelerations Nx, Ny, and/or Nz.

The IRS Generic FDI can be restricted to the angular velocity.

The IRS Generic FDI can be restricted to the attitude angles, with or without the angular velocities P, Q, and/or R.

Analytic redundancy can be replaced by direct comparison with attitude data such as provided with a vertical gyro or clinometer. Rate data can be indirectly obtained through filtered numerical differentiation of attitude measurements.

Attitude Heading Reference System (AHRS), Integrated Standby Instrument (ISO, or other more or less basic sensors may be used.

Clinometer(s) can be used to detect the vertical, and hence the roll and pitch attitudes Φ, θ, and/or Ψ.

Compass(es) and/or magnetometer(s) can be use to provide yaw angle and/or yaw rate.

Accelerometers can be used to provide a measurement of the vertical, and hence of the roll and pitch attitude. The attitude angles can be estimated when for example the acceleration vector magnitude is close to local gravity.

Validated angular rates and accelerations from the IRU can be used to simulate the operation and performance of vertical gyro(s) and hence provide complementary source(s) of attitude data. Such data can be used to validate the attitude data provided by the IRUs using the described process.

IRS Generic FDI can be implemented in the PFCC, or on separate computer or processors.

Other analytic redundancy expressions can be used, based on various kinematic or dynamic relationships.

Filtered and different compensation schemes can be applied to acquired and/or otherwise processed data. For example, compensation of the accelerations for angular and centrifugal acceleration contributions, and filtering for environment noise (e.g., using a low-pass filter, or notch filter as required). Considerations may be given for the case where the accelerometers (or other acceleration sensitive sensors) would be located sufficiently far from the IRUs to be significantly affected by angular and centrifugal accelerations.

Clipping or limiting of residues to maximum allowable positive and negative values can, and in some embodiments should be implemented as part of the SSFD or IGFDI to ensure that a single fault event or short sequence of faults corrupting momentarily the data from the sensors would not trigger the IGFDI monitor, especially if these results from events external to the sensors. This can guarantee that a minimum amount of persistence is required before the IGFDI monitor could indicate that a generic failure is affecting all the IRUs.

IRU(s) can be compared with associated direct mode sensor set(s), instead of comparing voted IRU signal(s) with voted direct mode sensor signal(s).

Positive and negative bias failure cases can be combined into absolute value based implementations, or implemented for multiple monitors. By selecting appropriate values for the parameters (design bias and threshold), one can provide an oscillation FDI capability.

The proposed scheme could also be modified to detect failures characterized solely by a change in the residual standard deviation, or by combinations of bias and standard deviations.

Some of the work could be extended to multiple hypothesis testing (as per more recent extensions to the SPRT test).

More sophisticated expressions for the residuals can include additional noise, bias, drift terms to capture various effects such as discretization (finite sampling rate of a inherently continuous system), quantization, drift, etc.

Monitor execution can be temporarily suspended (i.e. placed on 'HOLD') for any desired reason(s).

Filters may be implemented at different rates for a given signal (would require different design bias and threshold), or for different signals. This may for example reduce the impact of undesired correlation in the residual sequence.

Monitors may have analog implementations, or discrete circuit implementations, instead of or in addition to software implementations on digital processors. Simple circuitry or components can be used to make the monitor fully analyzable and testable.

The invention can also be modified to cope with residuals exhibiting non-normal statistical behaviour. In such cases, many elements of the invention would remain applicable, including some of the derived relationships, which are based on the theory of Brownian motion. It can be shown (i.e. this is a theorem) that a continuous time stochastic process with continuous sample paths and independent and identically distributed increments is a Brownian motion (i.e. Wiener process), and therefore it is normally distributed. This is a way to say that the residuals don't need to be normally distributed for many of the relationships used in this invention to hold.

Acceleration comparison (i.e. MSPRT) can be 'HELD' when angular rates and/or accelerations are large and the distance between the IRUs and (A)DMSs is significant.

On-line adaptation of the monitor threshold based on the on-line estimation of the current noise level. Design of the monitor and its performance can depend on the assumed and actual residue noise captured. Such noise is mainly contributed by the local sensor environment (e.g., vibration of the supporting structure to which the sensor is attached). Such noise may vary as a function of time, flight phase, aircraft configuration, etc. For example, the vibration level normally increases when the flap/slat and/or landing gear are extended. One could implement a process to estimate online the current noise level and adjust the parameter of the monitor as a function of the current value to optimize the sensitivity of the monitor without increasing its FAR.

As will be understood by those skilled in the relevant arts, IRUs 102, PFCCs 108, sensors, 112, and fault detection units 104, and their components and associated devices, can be implemented using any suitably-configured or adapted hardware, software, and/or firmware devices. A wide variety of such devices are now known, and available commercially; others will doubtless be developed hereafter. Examples of commercially-available components suitable for use as. IRUs in accordance with the invention are available from Honeywell and Litton. Suitable examples of PFCCs are available from companies such as Rockwell-Collins, Honeywell, BAE Systems, Smiths Aerospace, etc.

While the invention has been described and illustrated in connection with specific, presently-preferred embodiments, many variations and modifications may be made without departing from the spirit and scope of the invention. The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A fly-by-wire flight or other vehicle control system comprising:
   at least one Inertial Reference System (IRS) comprising a plurality of Inertial Reference Units (IRUs);
   at least one IRS Generic Fault Detection and Isolation (IGFDI) module for performing signal selection and fault detection on signals generated by the at least one IRS representing vehicle state data;
   at least one Augmented Direct Mode Sensor (ADMS) suite comprising a Direct Mode Sensor (DMS) suite augmented to generate signals representing independently-acquired vehicle state data corresponding to least a subset of the signals generated by the IRS;
   wherein the IGFDI also performs signal selection and fault detection on signals generated by the augmented DMS suite.

2. The system as claimed in claim 1, wherein the IGFDI comprises machine-readable computer programming executable by a processor of a primary flight control computer (PFCC).

3. The system as claimed in claim 1, wherein the DMS suite comprises a set of sensors configured for generating signals representing state variables sufficient for controlling the vehicle when a fully automatic fly-by-wire system is no longer operational.

4. The system as claimed in claim 3, wherein the ADMS suite is the DMS suite augmented to provide angular rates and linear accelerations for three orthogonal axes.

5. The system as claimed in claim 4, wherein the ADMS suite is the DMS suite augmented to provide at least two attitude angles.

6. The system as claimed in claim 1, wherein the IGFDI generates a residue by comparing the signals from the IRS and ADMS suite by applying a sequential probability ratio test to validate the integrity of the subset of signals.

7. The system as claimed in claim 6, wherein the subset of signals, once validated, are used to create complementary signals used in an analytical redundancy process to validate signals other than the subset of signals.

8. The system as claimed in claim 1 wherein the IGFDI generates a residue by comparing signals from the IRS and ADMS suite by applying a modified sequential probability ratio test to validate the integrity of the subset of signals.

9. The system as claimed in claim 8, wherein the subset of signals, once validated, are used to create complementary signals used in an analytical redundancy process to validate signals other than the subset of signals.

10. A method of controlling an aircraft or other vehicle performed by one or more data processors configured to provide command signals to one or more vehicle control devices, the method comprising:
receiving from at least one Inertial Reference System (IRS) comprising a plurality of Inertial Reference Units (IRUs) signals representing vehicle state data;
receiving from at least one Augmented Direct Mode Sensor (ADMS) signals representing independently-acquired vehicle state data corresponding to least a subset of the signals received from the IRS;
performing signal selection and fault detection processes on the signals received from the at least one IRS and on the corresponding signals received from the ADMS;
based at least partly on the signal and fault detection processes, determining whether at least one component of at least one of the IRS and ADMS is in a fault condition; and
based on the determination whether the at least one component is in a fault condition, providing to at least one vehicle control system device one or more vehicle control command signals.

11. The method of claim 10, wherein the determination whether the at least one component is in a fault condition comprises generating a residue by comparing the signals from the IRS and ADMS by applying a sequential probability ratio test to validate the integrity of the subset of signals.

12. The method of claim 11, comprising using a validated subset of vehicle state signals to create complementary signals for use in an analytical redundancy process to validate signals other than the subset of signals.

13. The method of claim 11, wherein the sequential probability test ratio test comprises a modified sequential probability ratio test.

14. Computer readable programming media storable in memory accessible by a vehicle control system comprising at least one data processor, the media comprising processor-executable programming adapted to cause the at least one processor to:
receive from at least one Inertial Reference System (IRS) comprising a plurality of Inertial Reference Units (IRUs) signals representing vehicle state data;
receive from at least one Augmented Direct Mode Sensor (ADMS) signals representing independently-acquired vehicle state data corresponding to least a subset of the signals received from the IRS;
perform signal selection and fault detection processes on the signals received from the at least one IRS and on the corresponding signals received from the ADMS;
based at least partly on the signal and fault detection processes, determine whether at least one component of at least one of the IRS and ADMS is in a fault condition; and
based on the determination whether the at least one component is in a fault condition, provide to at least one vehicle control system device one or more vehicle control command signals.

* * * * *